March 6, 1934. E. V. TAYLOR 1,950,275
BRAKE
Filed May 7, 1928 2 Sheets-Sheet 1
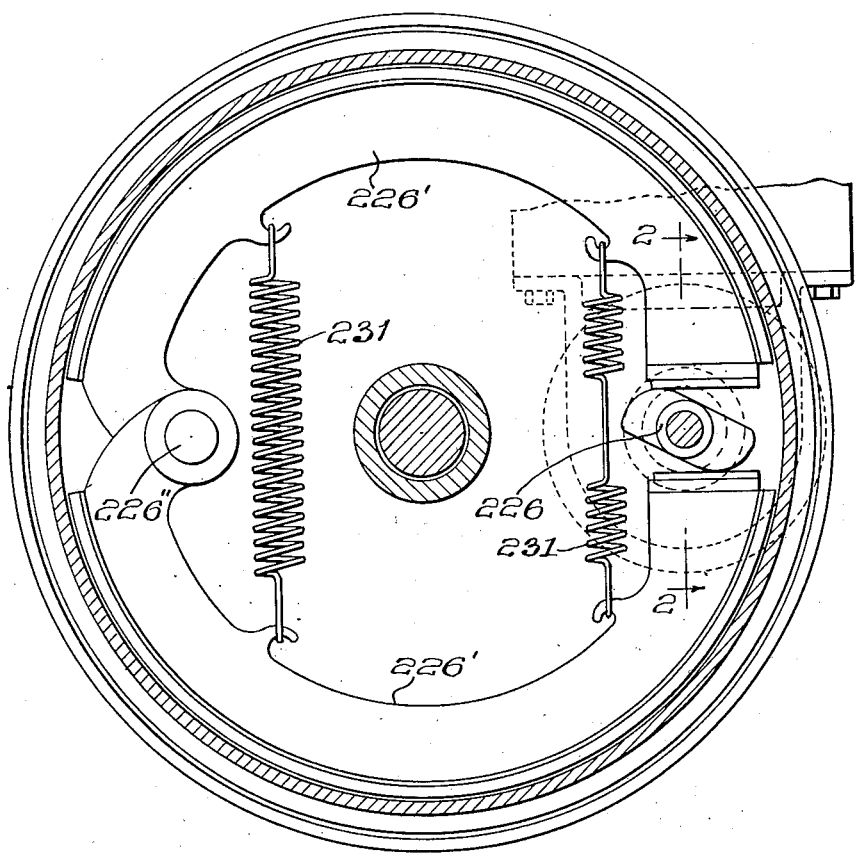
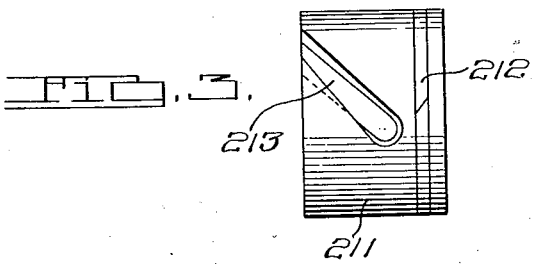
INVENTOR.
Eugene V. Taylor
BY
ATTORNEYS.

March 6, 1934.   E. V. TAYLOR   1,950,275
BRAKE
Filed May 7, 1928   2 Sheets-Sheet 2
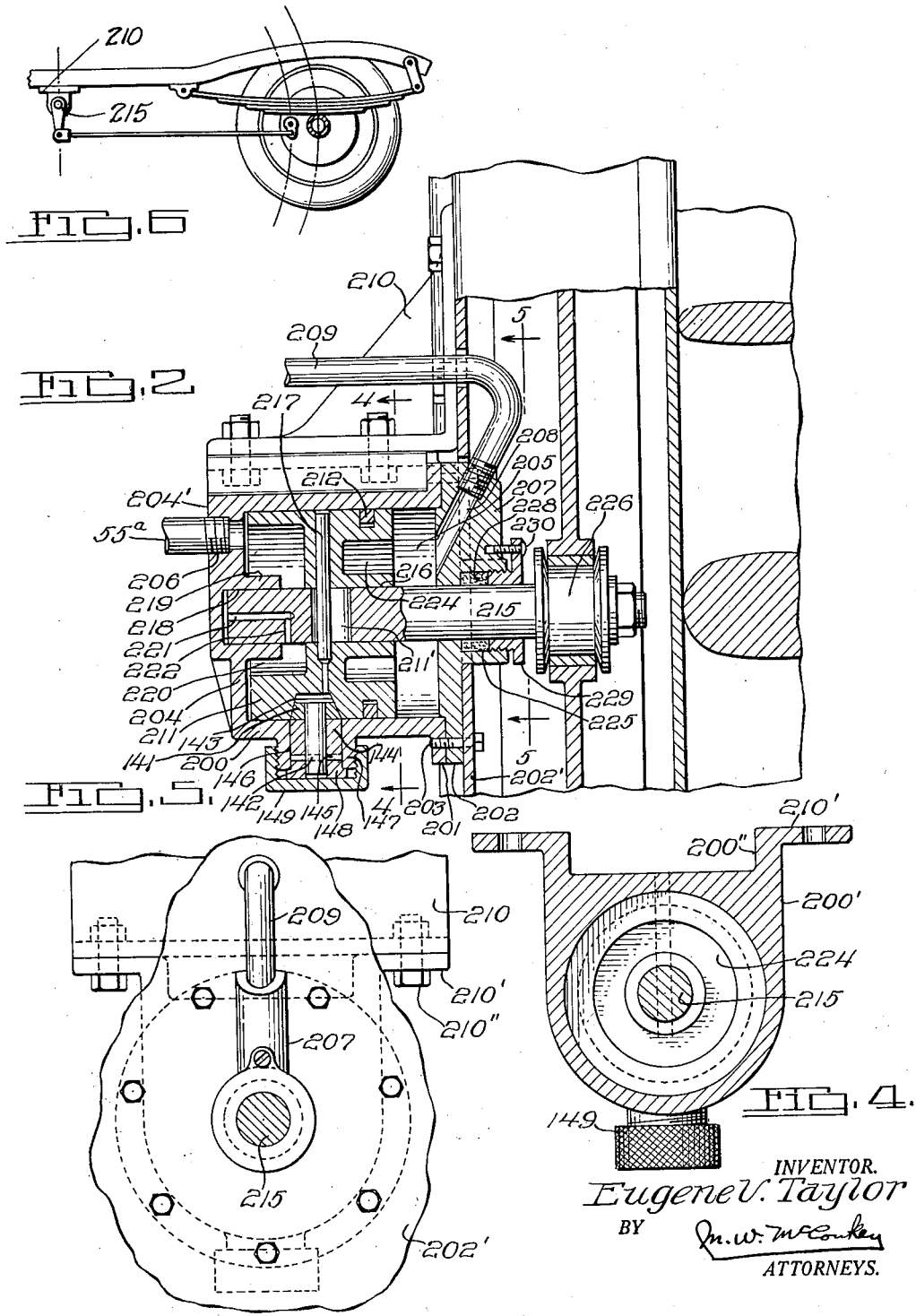
INVENTOR.
Eugene V. Taylor
BY
ATTORNEYS.

Patented Mar. 6, 1934

1,950,275

UNITED STATES PATENT OFFICE 1,950,275

BRAKE

Eugene V. Taylor, Chicago, Ill., assignor to Bendix Brake Company, South Bend, Ind., a corporation of Illinois Application May 7, 1928, Serial No. 275,670

7 Claims. (Cl. 188—152)

This invention relates to brakes and is illustrated as embodied in an improved hydraulic brake mechanism. An object of the invention is to couple the conventional type of brake structure such as the multiple shoe brake with a fluid-power system.

In automobile practice, thus far it has not been feasible to adapt the common type of brake for use in a hydraulic or other fluid-power brake system without many radical changes in construction. Obviously such a brake system would be more readily adapted to ordinary motor vehicles if the common type of retarding mechanism such as the multiple shoe brake could be readily connected to the system without necessitating any expensive changes in either the system or the brake. I, therefore, propose to provide a novel fluid-operated device adapted to couple a fluid system to a standard brake such as the cam-operated brake employed so extensively on automobiles at the present time.

By employing my device, it is possible to convert a linear movement created by the fluid-operated system, into a rotary movement, for the purpose of turning the brake cam or equivalent structure rendering operable the friction means.

An object of my invention is to provide a fluid-operated coupling device so designed as to be capable of effecting a return of the brake shoes or other friction device to an inoperative position. According to an important feature of my invention, this may be accomplished by rendering the piston or other fluid-actuated means, reciprocable within a cylinder by means of a suitable fluid entering, alternatively, oppositely disposed inlet ports, the fluid impinging upon the respective ends of the actuating piston or equivalent structure. Suitable auxiliary structure also effects a synchronized rotary and linear movement of the piston.

In one desirable arrangement, as illustrated, the cylinder is preferably attached to a chassis part such as the backing plate and is so arranged that the axis thereof lies in a line which is the prolongation of a line through the axis of the friction applying means within the brake drum.

Other minor but important features of the invention relates to novelly arranged fluid inlet ports, a novel combination of shaft lubricating oil ducts, and a novel piston, and in the illustrated embodiment the ports referred to may be arranged, one parallel with the piston axis, and the other at an angle thereto.

The advantages of the arrangements set forth, and various additional features of novelty and desirable details of construction will be apparent from the following description of one illustrated embodiment shown in the accompanying drawings, in which:

Figure 1 is a sectional view through the brake shoe structure, an end elevation of the cylinder being shown in dotted lines;

Figure 2 is a section taken on substantially the line 2—2 of Figure 1, looking in the direction of the arrows, the cylinder mechanism being shown in section, together with the fragmentary parts of the wheel and brake structure;

Figure 3 is a plan view of the novel piston employed;

Figure 4 is a section through the cylinder taken on line 4—4 of Figure 2, looking in the direction indicated by the arrows; and Figure 5 is a sectional view taken on substantially the line 5—5 of Figure 2, looking in the direction indicated by the arrows, and disclosing in elevation an end of the novel cylinder.

Figure 6 is a side elevation showing the cylinder mechanism attached to the vehicle chassis.

In the embodiment selected for illustration, a cylinder 200 may be provided with a flange 201 which may be secured to a closure cap member 202 by means of bolts 203. One end of the cylinder 200 is open, but is adapted to be closed by the plate 202 and both cylinder and plate may be suitably attached to the conventional backing plate 202'. The other end of the cylinder 200 may be closed by means of an end piece 204 which may be formed integral with the cylinder wall. A pipe 55$^a$ may be threaded into an opening 206 in an enlarged portion 204' of the cylinder end 204 which opening communicates with the bore 205 of the cylinder. The cap member 202 may be provided with an enlargement 207 in which is formed a diagonal opening 208 communicating with the interior of the cylinder bore 205. A pipe line 209 may be threaded into the opening 208. The cylinder 200 is adapted to be suitably connected to a chassis part of the automobile such as the backing plate by means of a bracket 210 such as the one illustrated in Figures 2 and 5. The cylinder may be provided with a squared upper portion 200', clearly disclosed in Figure 4, having at its edges, longitudinally outwardly extending flanges 200'' which in turn may be provided with laterally directed ears 210' adapted to be suitably secured to the bracket 210 as by bolts 210''.

As shown in Fig. 6, the cylinder may also be secured to the chassis frame by means of the bracket 210, in which case its point of attachment is so located that the brake rod, connecting the brake camshaft or other applying means with the piston connecting rod 215, lies in a neutral axis with respect to the wheel, axle and associated unsprung vehicle parts. In other words the operating cylinder may be located at a point on the chassis frame which is at or very near the axis about which the axle and associated parts revolve with the up and down movement of the body. When so positioned the relative movement of hydraulic actuator and brake parts is compensated for and such movement effects neither automatic tightening up or releasing of the brake nor undesired movements of the service pedal or hand lever connected to the operating system.

A piston 211 is positioned within the cylinder bore 205 and is adapted to be reciprocated by hydraulic means. The piston may be provided with a piston ring 212 and a diagonal groove 213 therein, as clearly indicated in Figure 3. A roller 141 is adapted to ride in a groove 213. The roller 141 may be slightly tapered and may be loosely mounted on a shaft 142 having a head portion 143. The shaft 142 telescopes a sleeve 144 and is suitably connected thereto by means of a pin 145 or its equivalent. The sleeve 144 extends into an aperture 146 partially defined by the cylinder wall and partially defined by a boss 147 which may be formed integral with the cylinder wall. Also the sleeve 144 has an enlarged or head portion 148 for preventing lateral movement of the roller 141 within the cylinder. A cap 149 may be threaded onto the boss 147 and serves to completely inclose the mechanism associated with the roller 141. Obviously by removing the cap 149, access may be had to the roller mechanism for the purpose of making replacement, that is to say, should the roller, for example, wear out, the same may be replaced by moving the cap 149 and removing the roller unit from the cylinder.

A shaft or connecting rod 215 extends into the bore 205 of the cylinder 200, as well as into an annular opening 216 formed concentric with the piston 211. This shaft 215 may be secured to the piston 211 by means of a pin 217 or equivalent structure, which pin passes through a longitudinal slot 211' in said shaft. Also the end of the shaft 215 inside of the cylinder 200 may extend into an opening 218 formed in a lug or boss 219. The lug 219 may be formed integral with the cap or end piece 204 of cylinder 200. It should be noted that the piston 211 is provided with a chamber 220 for receiving the lug 219 and which also receives the operating fluid. Also, the end of the shaft 215 within the cylinder 200 may be provided with a pair of oil ducts 221 and 222 for enabling the proper lubrication of the end of the shaft, journaled in lug 219. These ducts may be circular in cross section as illustrated and may extend one longitudinally and the other transversely of the shaft, intersecting each other at or about the center of the shaft. The transverse duct communicates, as illustrated, with the chamber 220 in the piston.

At the end of the piston 211 opposite to that having the pocket 220 an annular pocket 224 may be provided.

Shaft 215 extends through an opening 225 in the cap 202 and has its external end fastened to the brake-applying structure 226. which in turn actuates the conventional brake structure which may comprise shoes 226', anchored at 226'', and provided with the usual return springs 231.

A packing 228 may be disposed in the aperture 225 and is held in place by means of a member 229 which may be threaded into the aperture and locked in place by means of a screw or equivalent means 230. The operation of the invention is as follows:

Normally the piston 211 will be in the position shown in Figure 2. Upon the application of force to the fluid means in line 55$^a$, pressure will be applied to the piston 211 causing it to move away from the end 204. The presence of roller 141 co-operating with the diagonal groove will result in the piston 211 having a screwlike or helical movement. By this movement of the piston, shaft 215 will be rotated, imparting the necessary rotary motion to the brake-applying means.

When it is desired to release the brakes from the drum, fluid means in the line 55$^a$ will be relieved of pressure and pressure will be applied to the fluid in line 200 causing fluid under pressure to be forced against the associated end of piston 211 and into the pocket 224. This fluid means under pressure will move the piston 221 back to its initial position, forcing the fluid on the other side of the piston 211 out through the pipe line 55$^a$. Thus the shaft 215 will be enabled to return the brake-applying means 226 to its initial or inoperative position, obviating the use of the conventional return spring usually located within a hydraulic cylinder.

A simple and efficient brake-operating mechanism is thus produced combining the advantages of a hydraulic operating system with the well-known advantages of the mechanically-operated brake shoes, the structure illustrated effecting, by a reciprocable linear movement of the hydraulic structure, the necessary rotary movement of the shoe-operating mechanism alternatively rendering the same operative and inoperative.

While one illustrative embodiment of my invention has been described in detail, it is not my intention to limit its scope to that particular embodiment or otherwise than by the terms of the appended claims. This application constitutes a continuation in part of my prior application No. 145,109, filed October the 30th, 1926, as regards subject-matter which is common to the two applications.

I claim:

1. In a brake assembly, the combination with a hydraulic operating system, a friction retarding device, and rotatable operating means for actuating said retarding device, of a coupling device for connecting said system and operating means comprising a double acting fluid-operated actuating means the axis of which lies in a prolongation of the axis of said operating means.

2. In a brake operating mechanism, a friction retarding device, means including a rotatable shaft for rendering said friction retarding device operable, reciprocable operating means connected to said first mentioned means so that the axis of said shaft coincides with the axis of said reciprocable operating means, hydraulic means for moving said operating means longitudinally of said shaft in one direction, and hydraulic means for moving said operating means in the opposite direction.

3. A hydraulic brake system comprising a friction retarding device, a cylinder having a pair of ports one at each end of the cylinder, a reciprocable piston in said cylinder having a diagonal groove in its periphery, means mounted on the inner periphery of the cylinder adapted to ride in said groove to cause said piston to turn as it is moved, a shaft extending through one end of the cylinder and connected to the piston so that rotation of the piston causes rotation of the shaft, means associated with the shaft for rendering said friction retarding device operable, and means for supplying liquid under pressure selectively to either of said ports.

4. In a brake operating mechanism, a friction retarding device, a shaft for rendering said friction retarding device operable upon rotation thereof, a cylinder having a pair of ports one at each end of the cylinder, a reciprocable piston in said cylinder having a diagonal groove in its periphery, means mounted on the inner periphery of the cylinder adapted to ride in said groove to cause said piston to turn as it is moved, means connecting said piston to said shaft for imparting a screw-like movement to said shaft, and a socket formed integral with the inner wall of the cylinder for receiving an end of said shaft to guide it in its movement, the shaft extending through the opposite end of the cylinder.

5. In a brake operating mechanism a friction retarding device, and means including a piston provided at one end with a cylindrically shaped fluid receiving recess and at the other end with an annular shaped fluid receiving recess for rendering said friction retarding device operable.

6. In a brake operating mechanism a friction retarding device, a cylinder, a piston therein, a connecting rod associated with said piston capable of only rotary movement and having a sliding connection with said piston and adapted to render said friction retarding device operable, and means for effecting a synchronized rotary and linear movement of said piston selectively in either direction, whereby a rotary movement selectively in either direction may be imparted to said rod to actuate said friction retarding device.

7. In a brake operating mechanism a friction retarding device, a cylinder, a piston mounted for linear and rotary movement in said cylinder and formed with a longitudinal opening, a rod positioned in said opening and formed with a longitudinal slot, a pin connected to said piston and passing through said slot, means effective upon linear movement of said piston for causing rotary movement thereof, hydraulic means for imparting linear movement to said piston selectively in either direction, and means associated with said rod and effective upon rotation thereof for rendering said friction retarding device operatve or inoperative.

EUGENE V. TAYLOR.